United States Patent
Veluchamy et al.

(10) Patent No.: US 8,065,527 B2
(45) Date of Patent: Nov. 22, 2011

(54) SYSTEM AND METHOD FOR EMBEDDING A WRITTEN SIGNATURE INTO A SECURE ELECTRONIC DOCUMENT

(75) Inventors: Suresh Veluchamy, Las Vegas, NV (US); Gene Squitieri, Las Vegas, NV (US)

(73) Assignee: Signatureware Corporation, Las Vegas, NV (US)

( * ) Notice: Subject to any disclaimer, the term of this patent is extended or adjusted under 35 U.S.C. 154(b) by 1120 days.

(21) Appl. No.: 11/687,592

(22) Filed: Mar. 16, 2007

(65) Prior Publication Data

US 2008/0235577 A1    Sep. 25, 2008

(51) Int. Cl.
- H04L 9/32 (2006.01)
- G06K 9/00 (2006.01)
- G06Q 10/00 (2006.01)

(52) U.S. Cl. ............. 713/176; 382/119; 705/76; 726/16
(58) Field of Classification Search .................. 713/176; 726/2, 16; 382/119; 705/76
See application file for complete search history.

(56) References Cited

U.S. PATENT DOCUMENTS

| | | | |
|---|---|---|---|
| 5,544,255 A * | 8/1996 | Smithies et al. | 382/119 |
| 6,091,835 A | 7/2000 | Smithies et al. | |
| 6,185,683 B1 | 2/2001 | Ginter et al. | |
| 6,307,955 B1 | 10/2001 | Zank et al. | |
| 6,408,092 B1 * | 6/2002 | Sites | 382/187 |
| 6,671,805 B1 * | 12/2003 | Brown et al. | 713/176 |
| 6,751,632 B1 | 6/2004 | Petrogiannis | |
| 6,796,489 B2 | 9/2004 | Slater et al. | |
| 6,904,416 B2 * | 6/2005 | Nassiri | 705/51 |
| 7,085,735 B1 | 8/2006 | Hall et al. | |
| 2002/0053021 A1 * | 5/2002 | Rice et al. | 713/155 |
| 2004/0225884 A1 * | 11/2004 | Lorenzini et al. | 713/176 |
| 2005/0177389 A1 * | 8/2005 | Rakowicz et al. | 705/1 |
| 2006/0212708 A9 * | 9/2006 | Wong et al. | 713/176 |
| 2007/0043814 A1 * | 2/2007 | Allen et al. | 709/206 |
| 2007/0118751 A1 * | 5/2007 | Parlett et al. | 713/176 |

* cited by examiner

*Primary Examiner* — Kambiz Zand
*Assistant Examiner* — Michael Guirguis
(74) *Attorney, Agent, or Firm* — Thorpe North & Western LLP

(57) ABSTRACT

A system and method for embedding a written signature into a secure electronic document is disclosed. The method includes forming a placeholder electronic document containing content to be attested to by a signature. A signing individual can be selected from a signer list. A signature tag can be placed into the placeholder electronic document at a selected signature location. The signature tag is associated with the signing individual and defines the signature location for the signing individual to sign. The placeholder electronic document can be secured to form a secure electronic document having content configured to be uneditable. A signature can be captured with a signature capture device configured to enable the signing individual to write the signature to be embedded into the secure electronic document at the location indicated by the signature tag to mimic a real world experience of signing paper documents.

26 Claims, 10 Drawing Sheets

SYSTEM AND METHOD FOR EMBEDDING A WRITTEN SIGNATURE INTO A SECURE ELECTRONIC DOCUMENT

BACKGROUND

Signatures have been used for centuries to notarize and authenticate documents. A person's signature can give evidence of the provenance of a document as well as the intention of the person with regard to that document. For example, the role of a signature in many consumer contracts is not solely to provide evidence of the identity of the contracting party, but rather to additionally provide evidence of deliberation and informed consent. The unique properties of a person's signature have enabled their use as a legally binding indication that a signing individual, or signatory, understands and consents to documents containing their signature. Historically, signatures have also proven useful to thwart attempts at forgery. Even studious endeavors to write another's signature can often be detected by the trained eye.

With the advent of the digital age, a replacement for a person's handwritten signature has long been sought. However, despite the ability to transmit information over great distances with relative ease, an electronic substitute for the signature has been slow in coming. While many attempts have been made to create a digital equivalent for the signature, the written signature has proven difficult to replace. A comparable equivalent has not been found that includes a signatures unique ability to connect a person's intent and identity with the document upon which their signature is placed.

While there have been many attempts made by government, legal, and industry groups to create legally binding, digital equivalents to the written signature, many industries have been slow to adopt their efforts. The lack of an adequate replacement for the written signature has tended to reduce the amount of business and legal work that can be accomplished between remote locations.

SUMMARY

A system and method for embedding a written signature into a secure electronic document is disclosed. The method includes forming a placeholder electronic document containing content to be attested to by a signature. A signing individual can be selected from a signer list. A signature tag can be placed into the placeholder electronic document at a selected signature location. The signature tag is associated with the signing individual and defines the signature location within the placeholder electronic document for the signing individual to sign. The placeholder electronic document can be secured to form a secure electronic document having content configured to be uneditable. A signature can be captured with a signature capture device configured to enable the signing individual to write the signature to be embedded into the secure electronic document at a location indicated by the signature tag to mimic a real world experience of signing paper documents.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Despite the difficulty in finding a digital replacement for the written signature, there is still a great need to enable legal and business work to be conducted remotely. Obtaining written signatures is often an every day part of business and legal work. In accordance with one aspect of the invention, it has been recognized that a system and method is needed for embedding a written signature into a secure electronic document. Embedding a written signature into a secure electronic document in a digitized format can allow all of the unique benefits of a written signature to be retained, while enabling signed documents to be simply and easily electronically transmitted between remote locations.

Figure 1A:
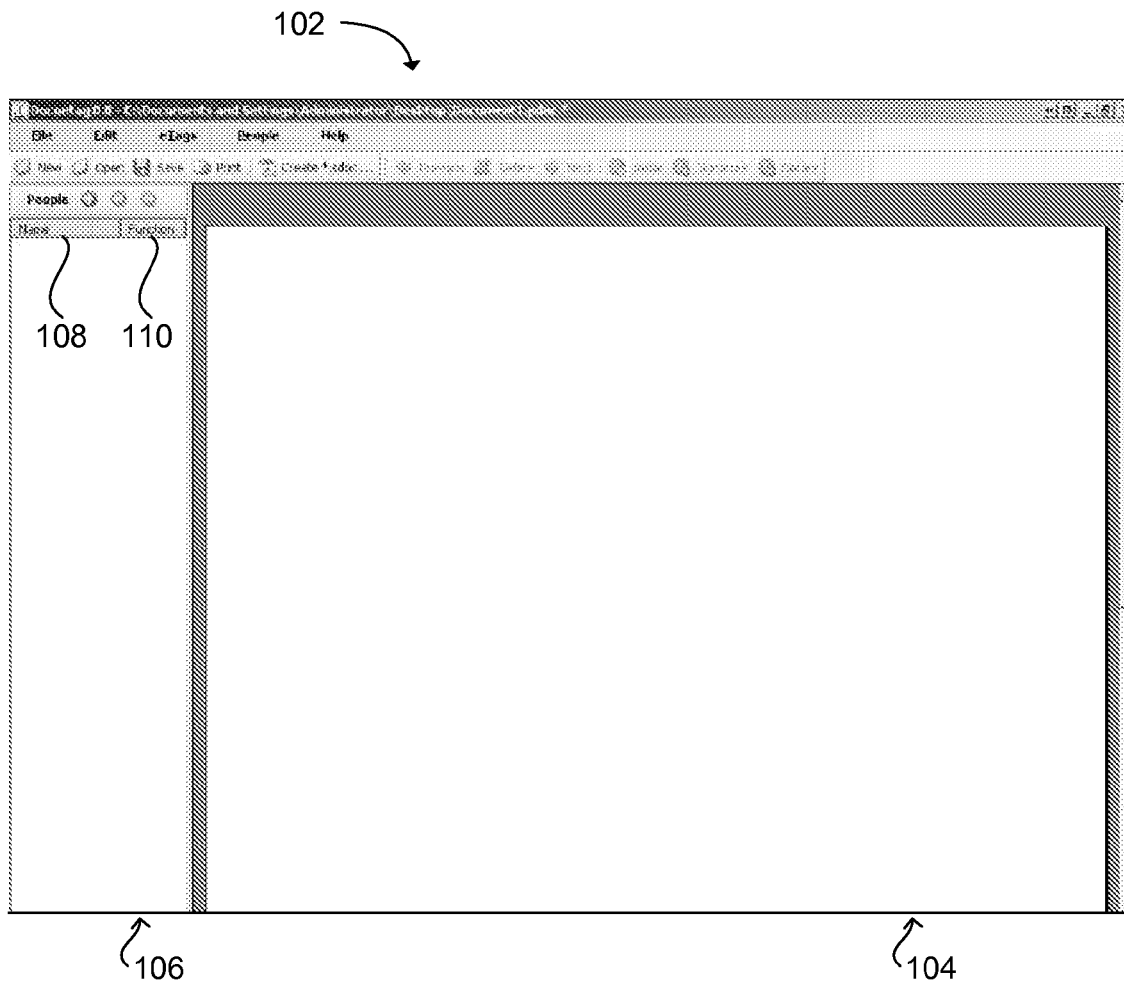
FIG. 1a is an illustration of an editing module configured to edit content in a placeholder electronic document, in accordance with an embodiment of the present invention.

The system and method for embedding a written signature into a secure electronic document can include an editing module. FIG. 1a illustrates an editing module 102 configured to edit content in an electronic document. The editing module can include a text editing area 104. The electronic document formed using the editing module can be referred to as a placeholder electronic document. The editing module can be used to draft or edit content that is to be attested to by a signature. The editing module can also be used to import and edit documents in the text editing area that were created using other software, such as Microsoft Word, WordPerfect, OpenOffice, Google Docs, and the like.

Figure 1B:
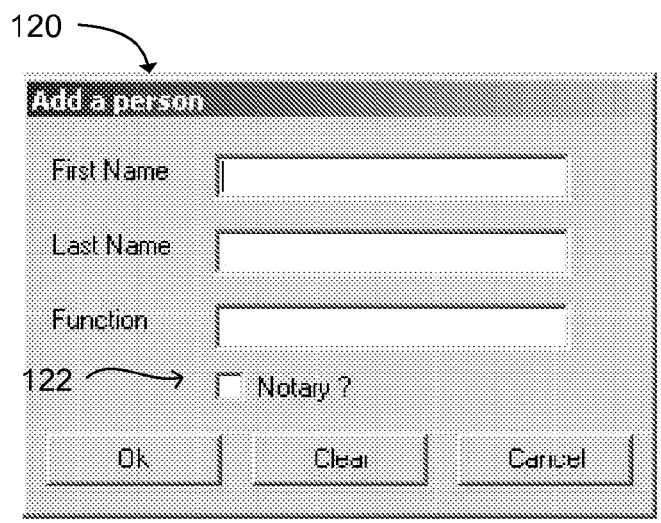
FIG. 1b is an illustration of a user interface for entering a signer name and function in accordance with an embodiment of the present invention.

A signer list module 106 can be included in or coupled to the editing module 102. As content is added in the text editing area 104, or after the content has been drafted or imported, locations for signatures can be added at desired locations. A user can add one or more names 108 to the signer list module of person(s) that will sign the document. The names can represent persons, or entity's represented by persons, that will sign the document. The person(s) that will sign the document are referred to as signing individuals. A function 110 of each signing individual can be associated with the individual's name. For example, their function relative to the document may be a buyer, a seller, an assignee, an assignor, a notary, a witness, and so forth. An example user interface 120 for entering a signing individual's name in the signer list module is shown in FIG. 1b. The function associated with the signing individual can also be entered. A notary checkbox 122 can be selected in the user interface to designate the signing individual as a notary, as will be discussed more fully below.

Figure 1C:
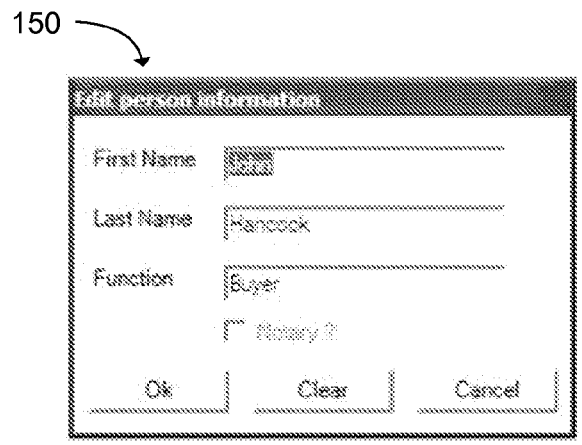
FIG. 1c is an illustration of a user interface for editing a signer name in accordance with an embodiment of the present invention.

A person or entity added to the placeholder electronic document in the signer list module can be edited. An example edit person user interface 150 for editing a name is shown in FIG. 1c. The edit person user interface can allow the name 108 and function 110 of each person or entity listed in the signer list module 106 (FIG. 1a) to be changed in the placeholder electronic document. In one embodiment, the signer list module 106 can verify that no duplicate names are added to the list, either initially or when editing the names. In another embodiment, the function of notary cannot be edited after a signing individual is designated as a notary. The checkbox in FIG. 1b can be automatically deactivated. The designated notary can only be deleted. In yet another embodiment, the function of notary can be actively edited and changed using the edit person user interface in the editing module 102 (FIG. 1a).

Figure 2:
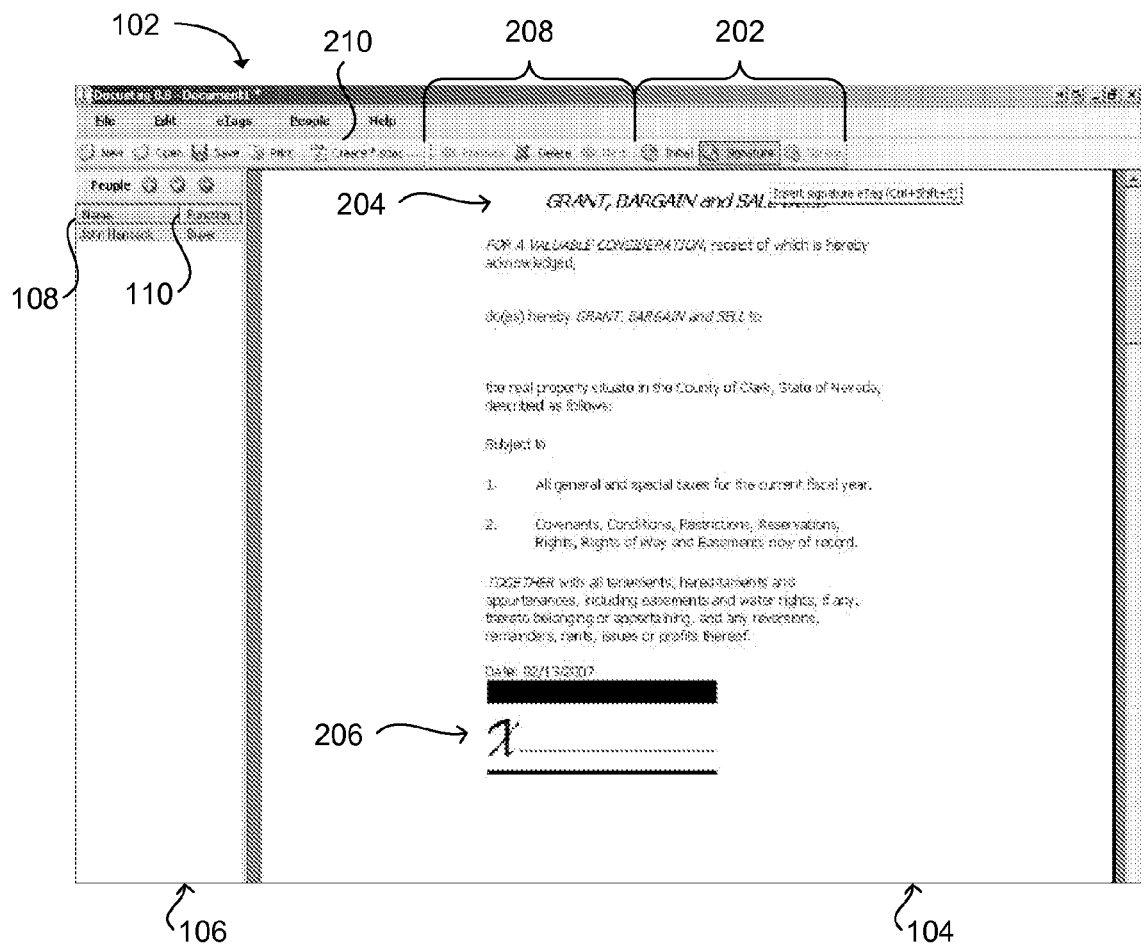
FIG. 2 is an additional illustration of an editing module in accordance with an embodiment of the present invention.

A tagging module 202, as shown in FIG. 2, can be included in or coupled to the editing module 102. For example, FIG. 2 shows one embodiment of the editing module containing a viewing pane for the text editing area 104 configured to display content 204 to be attested to with a signature. In one embodiment, a cursor can be placed at a location where a signature will be placed within the document. A signing individual in the signer list module 106 can be selected. A signature tag 206 can be placed within the document at a desired location where the cursor has been located. In another embodiment, the signature tag can be dragged and dropped to a desired location within the document.

Each signature tag 206 can have at least three types of information associated with the tag. In one embodiment, each tag can have a tag ID, a tag type, and a tag state. The tag ID can be a unique numerical number to distinguish each tag from other tags in the document. The tag having the lowest numerical number can be selected from a pool of tags. If a tag is deleted, the tag's associated ID can be returned to the pool to be reused. Any type of tag identification system can be used that allows the signature tags in the document to be uniquely identified by a computer.

The type of signature tag 206 that is placed in the placeholder electronic document can be selected using the tagging module 202. For example, FIG. 2 shows a signature button selected in the tagging module. Selecting the signature button will place a full signature tag at the selected location within the placeholder electronic document, providing a location for the signing individual to write their signature, as will be described more fully below. It is also possible to select an initial tag and a notary tag using the tagging module. The type of tags that can be selected may be dependent on a function of the selected signing individual.

The function 110 of the signing individual selected in the signer list module 106 can affect the types of tags that can be selected in the tagging module 202. In the example shown in FIG. 2, the signing individual is listed as a buyer. After selecting the signing individual, a signature tag 206 can be placed in the document by selecting the signature button for a full signature tag or the initial button for an initial tag. The notary tag is deactivated since the signing individual is not a notary. Conversely, if the signing individual has been designated with a function type of notary, the notary button can be selected and the initial and signature buttons can be automatically deactivated. Other types of tags can also be assigned to specific functions as desired.

Each signature tag 206 can also include information about a state of the tag. For example, the state may be signed or unsigned. The editing module 102 can include a tag navigation module 208. The tag navigation module can enable a user, such as a document preparer, to quickly view the tags within the document shown in the editing module 102 that are associated with a selected signing individual. For example, John Hancock can be selected in the signer list module 106. The Next button in the tag navigation module 208 can be selected to allow a user to view subsequent signature tags in the document that are associated with John Hancock. The user can also view previous tags by selecting the Previous button and can delete unwanted tags by selecting the Delete button.

The placeholder electronic document can be saved at any time. The document can be saved in a proprietary format that stores the document content with the information in the signer list module 106, as well as the location of and information associated with each signature tag. Once the placeholder electronic document is completed, with acceptable content 204 and the desired signature tags 206 placed within the document, a secure document creation module 210 enables the placeholder electronic document to be saved into a secure electronic document format. In one embodiment, this can be accomplished by selecting the Create *.sdoc button in the secure document creation module. Selecting this button will convert the placeholder electronic document into a secure format to form a secure electronic document.

The secure electronic document is configured to make the content of the placeholder electronic document uneditable. Content cannot be changed or removed. Signature tags and their associated information can also not be changed or removed. Thus, the secure electronic document provides an electronic form in which a document can be sent without concern for changes being made in the content or signature information.

The secure electronic document can be transmitted to one or more persons on the signer list module 106 to enable them to sign the document. The secure electronic document can be transmitted using known means, such as e-mail, file transfer protocol, and the like. Alternatively, the secure electronic document can be placed on a web server and accessed over the internet. For example, the secure electronic document may be accessed using hyper text transfer protocol (HTTP) or secure HTTP.

Figure 3:
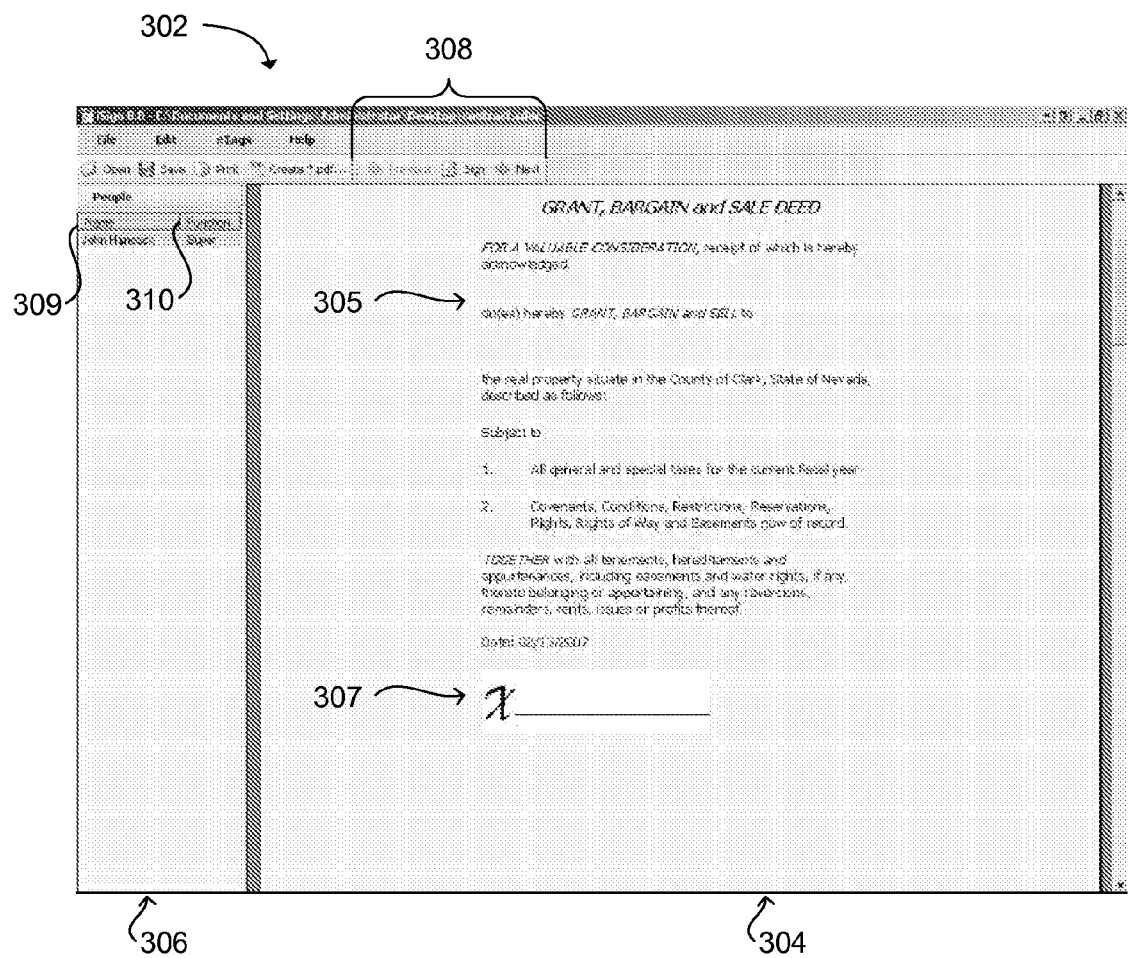
FIG. 3 is an illustration of a secure document signer module in accordance with an embodiment of the present invention.

A secure document signer module can be used to view the secure electronic document and the signature tags. The secure document signer module is configured to accept written signatures from the signing individuals at the signature tag location. An example embodiment of a secure document signer module 302 is shown in FIG. 3. The secure document signer module can be configured to have a similar appearance to the editing module 102. The similar appearance between the editing module and the secure document signer module can increase usability of the software. The secure document signer module can include a viewing pane 304. A signer list module 306 can be included in or coupled to the secure document signer module.

A user can open a secure electronic document that was previously created using the editing module 102 (FIGS. 1, 2) using the secure document signer module 302. The secure document signer module can display the content 305 and signature tag(s) 307. A signature capture module 308 can be included in or coupled to the secure document signer module. The signature capture module can be used in conjunction with a signature capture device to enable signing individuals to embed their written signature into the secure electronic document.

Figure 7A:
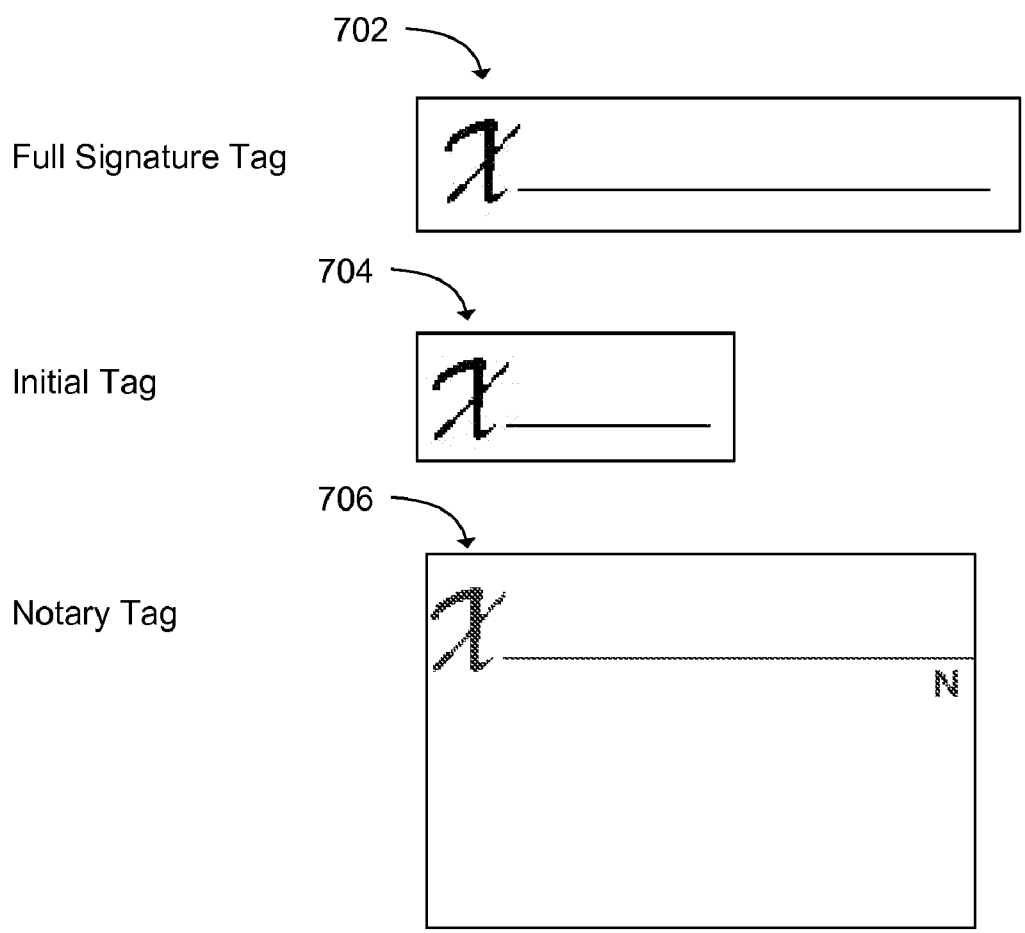
FIG. 7a is an illustration depicting various types of signature tags that can be inserted in the editing module in accordance with an embodiment of the present invention.

For instance, a signing individual listed in the signer list module 306 can select his or her name 309. The signing individual can then select the Sign button in the signature capture module 308. The signature capture module can be configured to communicate with a signature capture device. Activating the signature capture module can cause a first signature tag associated with the selected signing individual to be highlighted. The appearance of the signature tag can inform the signing individual what type of signature is needed at the highlighted signature tag. For example, the signature tag may be a full signature tag 702, an initial tag 704, or a notary tag 706, as shown in FIG. 7a. The signing individual can write the appropriate signature or initials corresponding with the highlighted tag using the signature capture device.

Figure 4A:
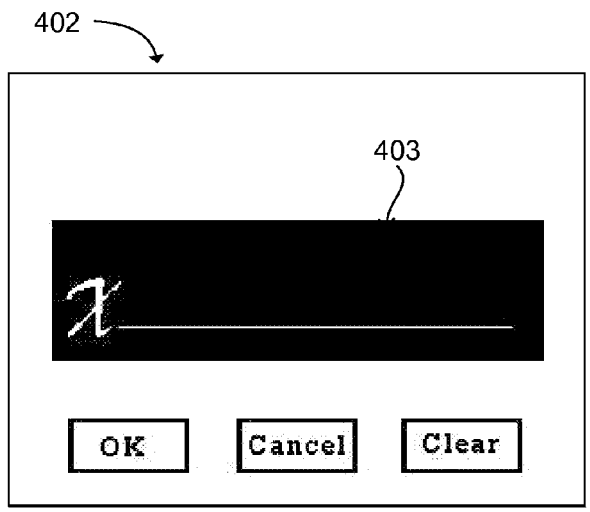
FIG. 4a is an illustration of a signature capture device displaying a signature capture bounding box in accordance with an embodiment of the present invention.
Figure 4B:
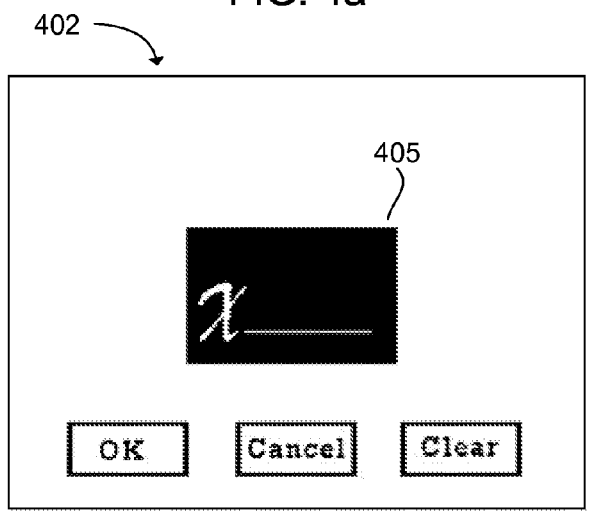
FIG. 4b is an illustration of a signature capture device displaying an initial capture bounding box in accordance with an embodiment of the present invention.

FIGS. 4a-4d illustrate an example embodiment for embedding a signature into the secure electronic document. After selecting a signing individual in the signer list module and selecting the Sign button in the signature capture module, the signing individual can write his or her signature in the signature capture device 402, as shown in FIGS. 4a and 4b. In one embodiment, the signature capture module can communicate with the signature capture device. The signature capture device can display a capture bounding box that is sized according to the type of signature designated by the signature tag. For example, FIG. 4a displays a signature bounding box 403. In another example, FIG. 4b displays the signature capture device with an initial bounding box 405. After writing a desired signature or initials in the bounding box 403, 405, the signing individual can select OK, enabling the written signature or initials to be electronically transmitted to the signature capture module in a digitized format.

Figure 4C:
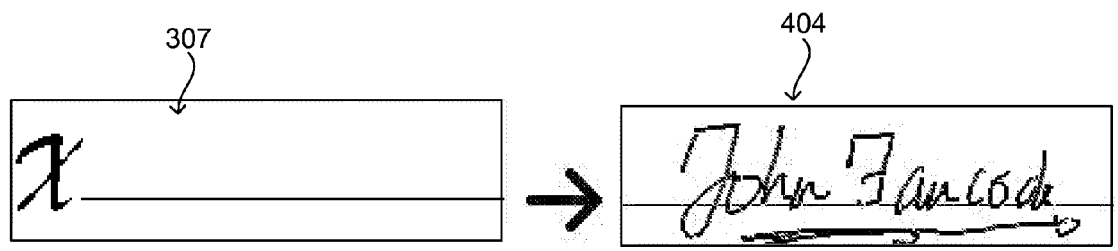
FIG. 4c is an illustration of a signature tag and an embedded signature in accordance with an embodiment of the present invention.
Figure 4D:
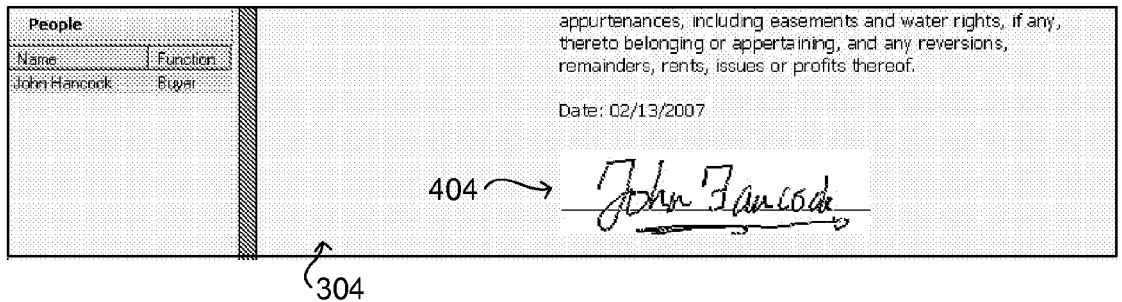
FIG. 4d is an illustration of a secure document signer module displaying an embedded signature in a secure electronic document in accordance with an embodiment of the present invention.

FIG. 4c demonstrates one embodiment in which the signature capture module can then communicate with the secure document signer module to replace the signature tag 307 with an embedded signature 404 at the signature tag location. FIG. 4d shows the embedded signature 404, as displayed in the viewing pane 304, which has been inserted into the secure electronic document in place of the signature tag.

The signature tag 307 and the embedded signature 404 can have a substantially similar size to the signature bounding boxes 403, 405 shown in FIGS. 4a and 4b. The substantially similar size of the signature tag, bounding box, and embedded signature can enable the handwritten signatures that are entered using the signature capture device 402 to be embedded in the secure electronic document in a near original size. The similar sizes can also prevent deformation of the signature due to changes in the dimension of the embedded signature image. If a change in size of the embedded signature is needed for a specific type of document, the embedded signature size can be changed proportionally with respect to the height and width to minimize any deformation of the original signature.

Figure 4E:
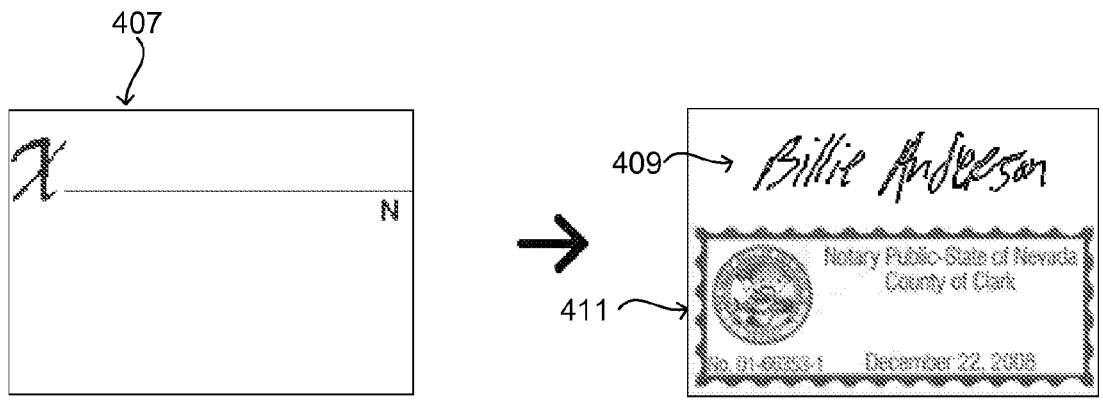
FIG. 4e is an illustration of a notary tag and an embedded signature with a notary stamp in accordance with an embodiment of the present invention.
Figure 4F:
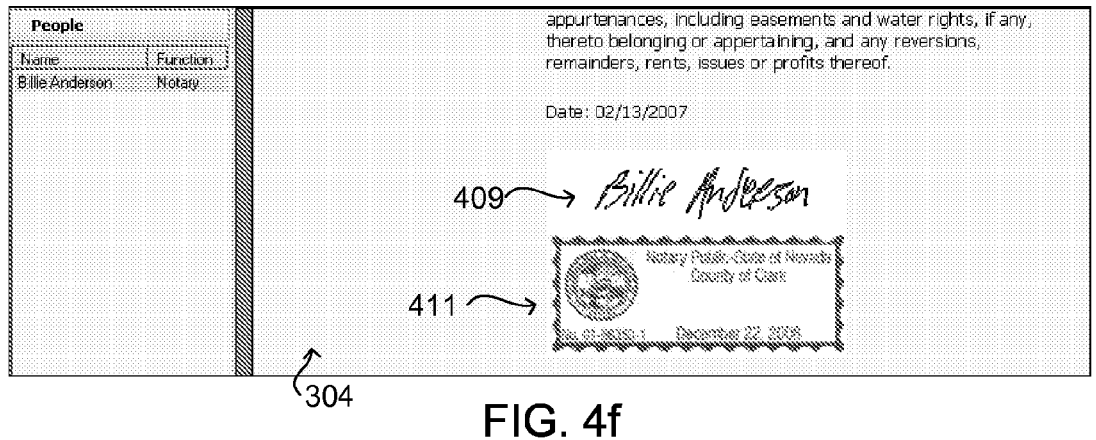
FIG. 4f is an illustration of a secure document signer module displaying an embedded notary signature and notary stamp in the secure electronic document in accordance with an embodiment of the present invention.

FIG. 4e demonstrates one embodiment in which the signature capture module can communicate with the secure document signer module to replace a notary tag 407 with an embedded notary signature 409 and a notary stamp 411 corresponding with the embedded signature of the notary, as previously described. FIG. 4f shows the embedded notary signature 409 and associated signature tag 411, as displayed in the viewing pane 304, which has been inserted into the secure electronic document in place of the notary tag.

The signature capture device 402, as shown in FIG. 4a, can be any type of electronic signature capture device capable of communicating with a computer. Alternatively, the signature capture device can be built in to a computer, such as a touch screen or tablet type computer. The signature capture device can be configured to remotely communicate with the signature capture module and/or the secure electronic document signer module. The communication means can include communication through a local area network, a wide area network, an internet connection, a wireless connection, a wired connection including a USB connection, a telephone connection, and a broadband connection.

Returning to FIG. 3, an auto scrolling module can be coupled to the secure document signer module 302. The auto scrolling module can be embedded with the signature capture module 308. The auto scrolling module can allow the secure document signer module to automatically scroll from a first signature tag related to a signing individual to a next signature tag related to the signing individual after the signing individual's signature is embedded at a location of the first signature tag in the secure electronic document displayed in the viewing pane 304. The auto scrolling module can know the state of the tag (signed or unsigned) to enable a signing individual to automatically scroll to a next unsigned signature tag associated with the signing individual.

A tag navigation module can allow the signing individual to manually navigate through the document to view the locations for his or her signature. Tag navigation can be accomplished, for example, by selecting one of the next and previous buttons available in the signature capture module 308. Selecting one of the next and previous buttons will allow a user to view the signature tags or embedded signatures associated with the person 309 selected in the signer list module 306.

In one embodiment, the secure document signer module 302 can provide a secure sign-in procedure to provide security such that a signing individual can only sign at signature tags 307 associated with the signing individual. For example, when a signing individual receives a secure electronic document, they can open the document with the secure document signer module. In order for the signing individual to select their name 309 from the signer list module 306, they can enter a predetermined password in a password user interface. Alternatively, the password user interface may be activated when a user selects a signing individual in the signer list module. Password protection can provide an additional level of security to the secure electronic document to ensure that each embedded signature is authentic.

Figure 5:
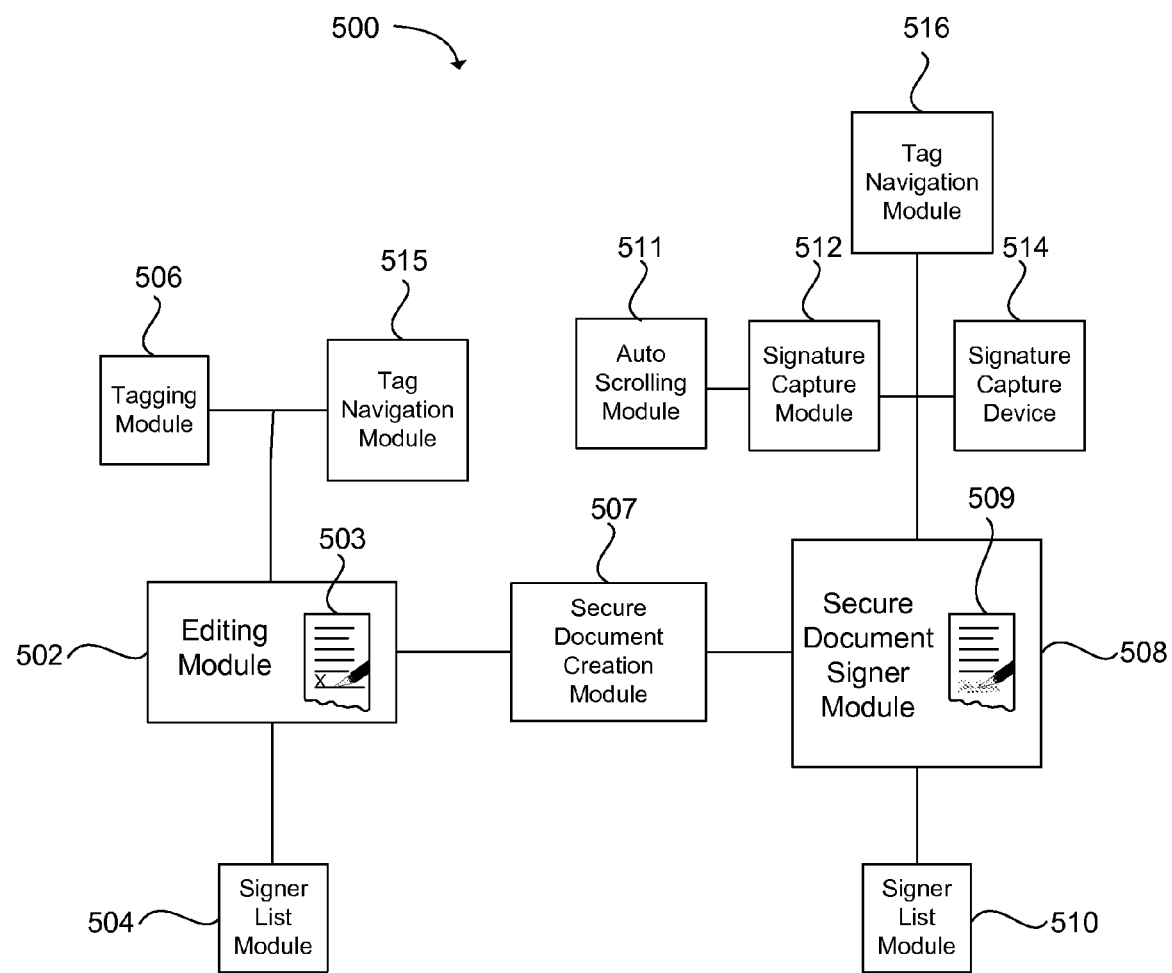
FIG. 5 is an illustration of a system for embedding a written signature into a secure electronic document in accordance with an embodiment of the present invention.

The user interfaces, as illustrated and previously described, represent specific embodiments of the systems and methods disclosed. Of course, a wide variety of different types of user interfaces are possible. FIG. 5 illustrates a more generalized view of a system 500 for embedding a signature into a secure electronic document. The system includes an editing module 502 configured to edit content in an editable document 503. The grammatical and/or illustrative content that is drafted or imported into the editing module can be attested to by a signature. A signer list module 504 is coupled to the editing module. A user can enter one or more persons or entities into the signer list module that will attest to the content in the document with a signature. A tagging module 506 provides signature tags that can be placed in the document at a desired location for a signature. Each tag is associated with a person or entity in the signer list module. The tags can also be associated with additional information, such as a unique identifier number, a tag type, and a signing status, as previously discussed. Different types of signature tags can be placed in the document, including an initial tag, a full signature tag, and a notary tag. A tag navigation module 515 can be used to navigate between signature tags associated with a selected signing individual by selecting one of a Next and a Previous button.

The editable document 503 containing signature tags can be saved in a proprietary format as a placeholder electronic document. The placeholder electronic document is fully editable, allowing changes in the content as well as the location and type of signature tags in the document. Persons or entities placed in the signer list module 504 can also be edited or removed. When the document is in a final form ready for signing then the document can be converted into a secure electronic document through the secure document creation module 507 to form a secure electronic document 509.

The secure electronic document 509 can be opened in a secure document signer module 508. Once the document is converted into a secure form then no content changes are allowed. The persons and entities listed in the signer list module 510 can not be edited or removed. The location and types of signature tags in the secure electronic document are also uneditable. The only alteration that can be made in the secure electronic document is for the persons or entities listed in the signer list module 510 to embed their written signature into the secure electronic document 509 at signature tag locations associated with the person or entity.

The signature tag type can be communicated to the signature capture device 514 from the signature capture module 512 or secure document signer module 508. As previously discussed, the signature capture device can be configured to display an appropriately sized bounding box based on the type of signature tag. For example, one size of bounding box may be displayed in the signature capture device when a full signature is needed. A different sized bounding box can be displayed when initials are needed in the secure electronic document 509. Having a bounding box with a similar size to the signature tag and/or embedded signature enables a life sized embedded signature to be displayed. If a change in size of embedded signature is needed for a specific type of document, the embedded signature size will typically be changed proportionally with respect to the height and width to minimize any deformation of the original signature.

A signing individual can select themselves or the entity that they represent in the signer list module 510 and activate the signature capture module 512. The signing individual can then use a signature capture device 514 coupled to the signature capture module and/or the secure document signer module 508 to write their signature. The signature can then be embedded at a signature tag location as previously discussed. Each signature tag location can require a separate signature or initial. A single signature is typically not copied to multiple signature tag locations. Once a signature has been embedded, an auto scrolling module 511 can automatically scroll to a next signature tag associated with the selected signing individual. A tag navigation module 516 can also be used to manually navigate between signature tags associated with a selected signing individual. For example, the tag navigation module can enable manual viewing of embedded signatures or signature tags associated with a selected signing individual by selecting one of a Next and a Previous button. Other types of graphical user interfaces can also be used to allow the manual viewing of signatures and signature tags associated with each signing individual.

Figure 6:
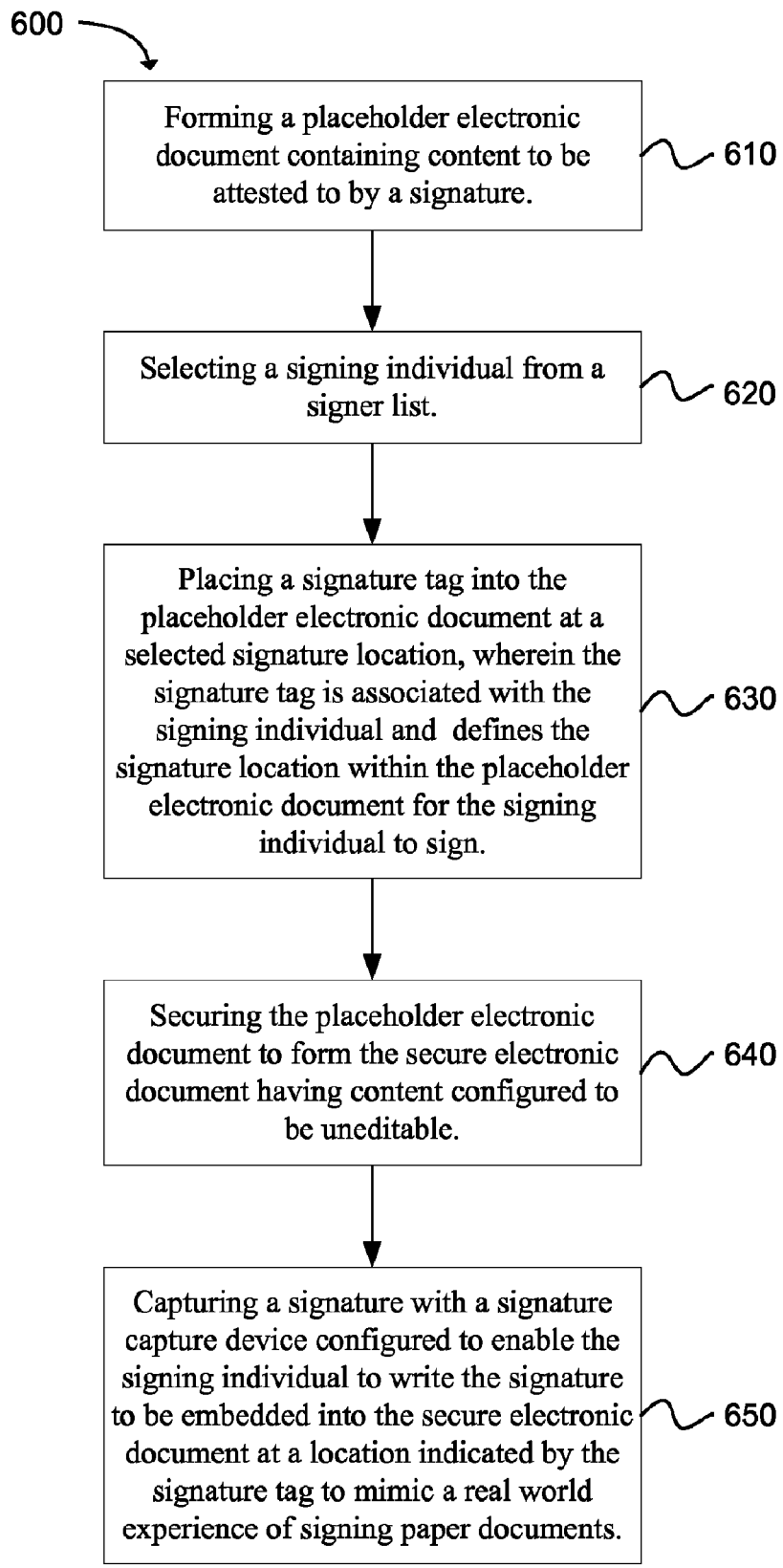
FIG. 6 is a flow chart depicting a method for embedding a written signature into a secure electronic document in accordance with an embodiment of the present invention.

Another embodiment of the invention provides a method 600 for embedding a written signature into a secure electronic document, as illustrated in the flow chart in FIG. 6. The method includes the operation of forming 610 a placeholder electronic document containing content to be attested to by a signature. A further operation involves selecting 620 a signing individual from a signer list. Another operation includes placing 630 a signature tag into the placeholder electronic document at a selected signature location, wherein the signature tag is associated with the signing individual and defines the signature location within the placeholder electronic document for the signing individual to sign.

A further operation involves securing 640 the placeholder electronic document to form the secure electronic document having content configured to be uneditable. Another operation provides capturing 650 a signature with a signature capture device configured to enable the signing individual to write the signature to be embedded into the secure electronic document at a location indicated by the signature tag to mimic a real world experience of signing paper documents. The signature can be captured and embedded into the secure electronic document in real time, at a time the signing transaction takes place.

A plurality of signing individuals can be added to the signer list. Each signature tag can be associated with an individual or entity in the signer list. Each signing individual in the signer list can be associated with a function, such as buyer, seller, and notary. Some functions may be given different rights than other functions. For example, a notary may be allowed to insert a notary stamp along with the notary's signature. The notary's signature and stamp may be inserted into the secure electronic document as separate embedded items. Alternatively, the signature and stamp may be inserted as a single embedded item or electronic image.

Several different types of signature tags can be placed in the placeholder electronic document, including a full signature tag 702, an initial tag 704 and a notary tag 706, as shown in FIG. 7*a*. Each tag can have a unique appearance allowing a user to discern what type of signature is to be written at each location in the document. Each signature tag can be selected from a pool of signature tags having unique identification. Once the signature tag is placed in the document, the tag can also be associated with information related to a status of the tag, such as signed or unsigned.

Figure 7B:
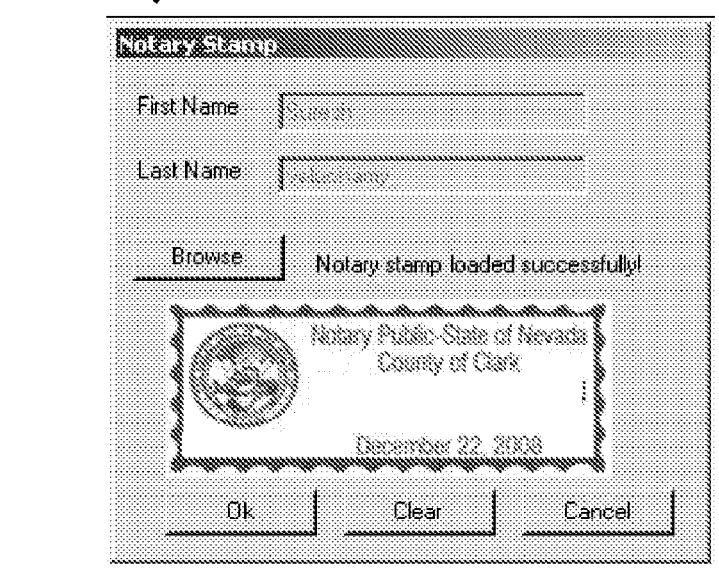
FIG. 7b is an illustration of a user interface for inserting a notary stamp in a notary tag in accordance with an embodiment of the present invention.

The notary tag can have a larger space set aside to enable the notary's signature and stamp to be placed in the notary tag area. In one embodiment, as shown in FIG. 7b, a notary stamp user interface 750 can be used that enables a notary to load a digitized version of their notary stamp. The notary stamp can be associated with the notary's signature and embedded in the secure electronic document at the location of the notary's tag, as previously discussed.

The secure electronic document can be saved with one or more embedded signatures. The captured signatures themselves are typically not saved. Thus, in order for each signature to be embedded within the secure electronic document at a signature tag location, a signing individual must write their signature using a signature capture device. In one embodiment, a secure electronic document can be sent in series to each person or entity listed in the signer list. After a first individual on the signer list completes signing the secure electronic document, the document can be saved and sent to the next person or entity on the signer list, and so forth until each person on the signer list has completed signing the document. This allows multiple people in locations remote from one another to sign the secure electronic document without the need for each signing individual to travel to a single location.

Figure 8:
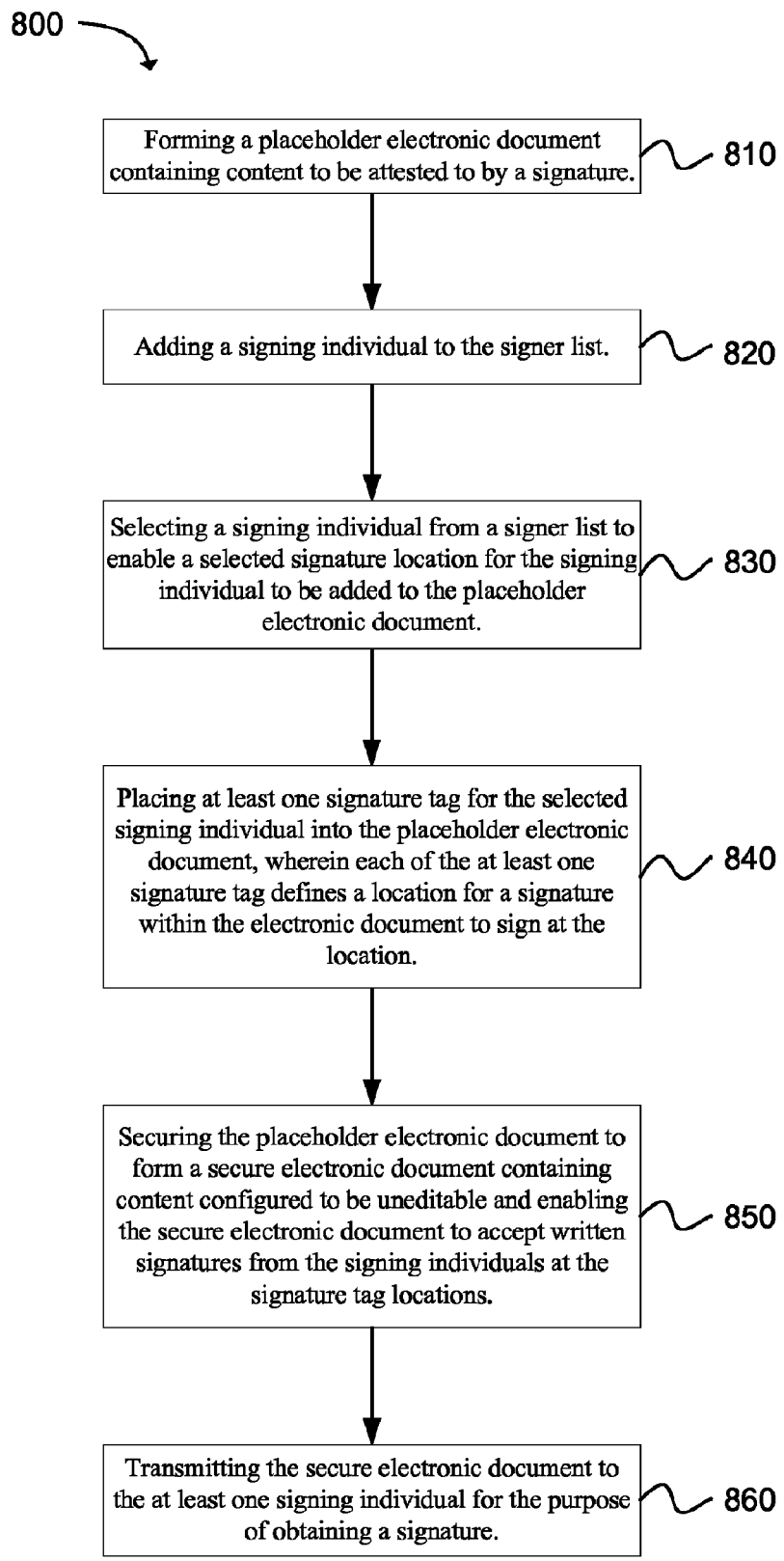
FIG. 8 is a flow chart depicting a method for transmitting an electronic document for embedding a written signature in accordance with an embodiment of the present invention.
Figure 9:
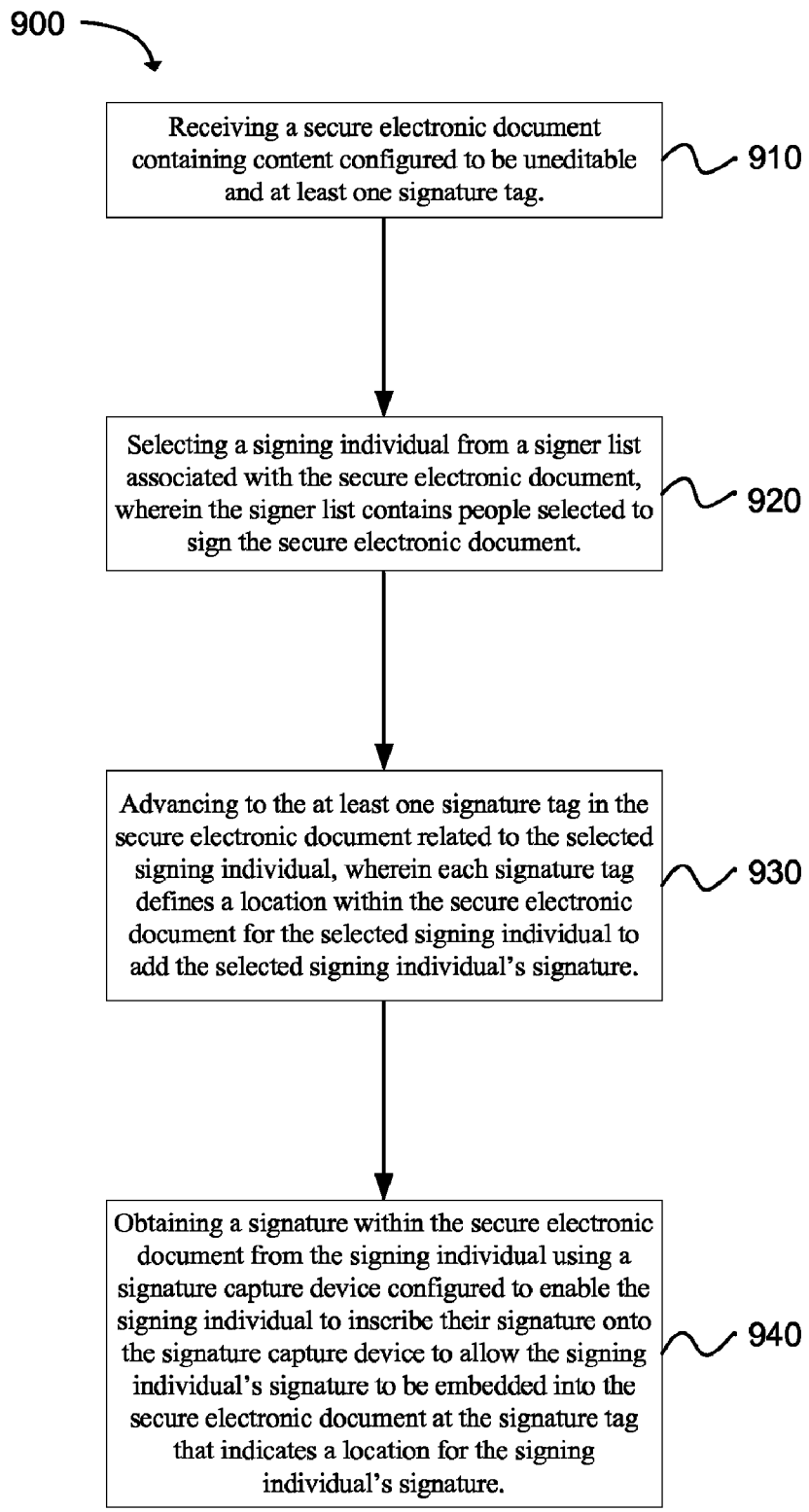
FIG. 9 is a flow chart depicting a method for receiving an electronic document for embedding a written signature in accordance with an embodiment of the present invention.

In another embodiment, a method 800 for transmitting an electronic document for embedding a written signature is disclosed, as shown in the flow chart in FIG. 8. The method enables a user to prepare a placeholder electronic document having a one or more signature tags and transmit the secure electronic document to a signing individual to obtain their signature. The method includes the operation of forming 810 a placeholder electronic document containing content to be attested to by a signature. An additional operation includes adding 820 a signing individual to the signer list. A further operation provides selecting 830 a signing individual from a signer list to enable a selected signature location for the signing individual to be added to the placeholder electronic document.

The method 800 additionally includes placing 840 at least one signature tag for the selected signing individual into the placeholder electronic document, wherein each of the at least one signature tag defines a location for a signature within the electronic document to sign at the location. An additional operation provides securing 850 the placeholder electronic document to form a secure electronic document containing content configured to be uneditable and enabling the secure electronic document to accept written signatures from the signing individuals at the signature tag locations. A further operation provides transmitting 860 the secure electronic document to the at least one signing individual for the purpose of obtaining a signature.

The user that transmits the secure electronic document can obtain a signature within the secure electronic document from the at least one signing individual using a signature capture device configured to enable the signing individual to inscribe their signature onto the signature capture device to allow the signing individual's signature to be embedded into the secure electronic document at the signature tag that indicates a location for the signing individual's signature.

A method 900 is disclosed for receiving an electronic document for embedding a written signature. For example, a signing individual may receive a secure electronic document having at least one signature tag. The signing individual may embed their signature at the at least one signature tag and return the document to the sender, or send the document for additional signatures.

The method 900 includes the operation of receiving 910 a secure electronic document containing content configured to be uneditable and at least one signature tag. An additional operation provides selecting 920 a signing individual from a signer list associated with the secure electronic document, wherein the signer list contains people selected to sign the secure electronic document. Another operation includes advancing 930 to the at least one signature tag in the secure electronic document related to the selected signing individual, wherein each signature tag defines a location within the secure electronic document for the selected signing individual to add the selected signing individual's signature.

The method further includes the operation of obtaining 940 a signature within the secure electronic document from the signing individual using a signature capture device configured to enable the signing individual to inscribe their signature onto the signature capture device to allow the signing individual's signature to be embedded into the secure electronic document at the signature tag that indicates a location for the signing individual's signature.

The system and methods disclosed provide a simple, user friendly process for embedding a written signature into a secure electronic document. The process does not require any complex codes and numbers instituted in many government, legal, and industry group standards for electronic signatures. While the codes and numbers may provide a level of security, the visual information provided by a written signature is eliminated. Parties to a signatory document have historically relied on the visual information provided by a simple signature. The system and methods disclosed in the recited claims allows the unique benefits of a written signature to be retained. Thus, the process disclosed preserves centuries of legal and business precedent while enabling signed documents to be simply and easily electronically transmitted between remote locations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for embedding a written signature into a secure electronic document, comprising:
   forming a placeholder electronic document containing content to be attested to by a signature;
   selecting a signing individual from a signer list;
   placing a signature tag into the placeholder electronic document at a selected signature location, wherein the signature tag is associated with the signing individual and defines the signature location within the placeholder electronic document for the signing individual to sign;
   securing the placeholder electronic document to form the secure electronic document having content configured to be uneditable;
   sizing an unsigned signature bounding box on a signature capture device based on a type of the signature tag at the signature location, wherein the signature bounding box is displayed independently of a display of the secure electronic document; and
   capturing a signature with the signature capture device within the signature bounding box as the signature is written by the signing individual, the signature capture device being configured to enable the signing individual to write the signature to be embedded into the secure electronic document at the signature location indicated by the signature tag to mimic a real world experience of signing paper documents.

2. A method as in claim 1, further comprising placing a signature tag, wherein the type of the signature tag is one of a full signature tag, a notary tag and an initial tag.

3. A method as in claim 1, wherein placing the signature tag further comprises obtaining the signature tag from a pool of signature tags, wherein each signature tag is associated with a unique identification number, the method further comprising returning the unique identification number to the pool for reuse when an associated signature tag is deleted.

4. A method as in claim 3, wherein the signature tag further comprises tag type information including one of a full signature tag type, a notary tag type and an initial tag type and tag state information including one of signed information and unsigned information.

5. A method as in claim 1, further comprising adding a plurality of signing individuals to the signer list to enable the signature tag to be associated with one of the plurality of signing individuals, and verifying that the plurality of signing individuals added to the list includes no duplicate names using a signer list module.

6. A method as in claim 5, further comprising placing a unique signature tag associated with the selected signing individual from the plurality of signing individuals at every location throughout the placeholder electronic document where the signing individual will sign.

7. A method as in claim 5, further comprising associating each of the plurality of signing individuals as one of a signer and a notary.

8. A method as in claim 7, further comprising embedding an electronic image comprising a notary stamp associated with the notary and the signature of the notary at the selected signature location indicated for the notary by the signature tag associated with the notary.

9. A method as in claim 1, further comprising configuring the secure electronic document such that the embedded signature can be saved in the secure electronic document.

10. A method as in claim 1, wherein capturing a signature further comprises capturing a signature at a time a transaction takes place.

11. A method as in claim 2, wherein capturing a signature further comprises capturing initials from the signing individual at a selected location indicated by the initial tag.

12. A system for embedding a written signature into a secure electronic document, comprising:
an editing module configured to edit content in a placeholder electronic document, wherein the content is to be attested to by a signature;
a signer list module comprising a list of selectable signing individuals;
a tagging module for adding at least one signature tag associated with the selected signing individual to the placeholder electronic document, wherein each of the at least one signature tag defines a location for a signature within the electronic document and indicates the signing individual associated with the signature tag to sign at the location;
a secure document creation module for securing the content in the placeholder electronic document to form a secure electronic document containing content configured to be uneditable;
a secure document signer module to enable the secure electronic document to be viewed and to accept written signatures from the signing individuals at the signature tag location;
a signature capture device configured to enable the signing individual to write a signature at a transaction time for each of the at least one signature tag associated with the signing individual and further configured to size an unsigned signature bounding box based on a type of the signature tag at the location, wherein the signature bounding box is displayed independently of a display of the secure electronic document; and
a signature capture module configured to electronically embed the signature of the signing individual from bounds of the the signature bounding box on the signature capture device into the secure electronic document at a location of each of the at least one signature tag associated with the signing individual.

13. A system as in claim 12, wherein the signature capture module further provides a secure sign-in procedure to enable the signing individual to only sign at signature tags associated with the signing individual.

14. A system as in claim 12, wherein each separate signer is placed into an authorized signer list.

15. A system as in claim 12, wherein the signer list module enables each of the signing individuals to be identified as one of a signer and a notary.

16. A system as in claim 15, wherein the tagging module enables at least one signature tag associated with the signing individual identified as the signer to be placed in the placeholder electronic document, wherein the signature of the signing individual is one of a written signature and initials of the signing individual.

17. A system as in claim 15, wherein the tagging module enables at least one signature tag that is a notary tag associated with the signing individual identified as the notary to be placed in the placeholder electronic document, wherein the signature of the signing individual identified as a notary is embedded as an electronic image comprising a notary stamp associated with the notary and the signature of the notary at the selected signature location indicated for the notary by the notary tag in the secure electronic document.

18. A system as in claim 12, wherein at least one of the signature capture module and the signature capture device are configured to remotely communicate with the secure electronic document to enable a written signature to be obtained from a remote location at a time of a transaction.

19. A system as in claim 18, wherein the signature capture device is configured to remotely communicate with the secure electronic document signer module through at least one communication means selected from the group consisting of a local area network, a wide area network, an internet connection, a wireless connection, a wired connection, a telephone connection, and a broadband connection.

20. A system as in claim 12, further comprising an automatic scrolling module configured to automatically scroll from a first signature tag related to a signing individual to a next signature tag related to the signing individual after the signing individual's signature is embedded at a location of the first signature tag in the secure electronic document.

21. A system as in claim 12, further comprising a tag navigation module configured to enable a preparing individual to review the at least one signature tag present in the placeholder electronic document and associated with the selected signing individual by selecting the signing individual and one of a next and a previous button.

22. A system as in claim 12, further comprising a tag navigation module configured to enable the signing individual to review before signing signature tags related to the signing individual present in the secure electronic document by selecting one of a next and a previous button.

23. A method for transmitting an electronic document for embedding a written signature, comprising:

forming a placeholder electronic document containing content to be attested to by a signature;

adding a signing individual to the signer list;

selecting a signing individual from a signer list to enable a selected signature location for the signing individual to be added to the placeholder electronic document;

placing at least one signature tag for the selected signing individual into the placeholder electronic document, wherein each of the at least one signature tag defines a location for a signature within the electronic document to sign at the location;

securing the placeholder electronic document to form a secure electronic document containing content configured to be uneditable and enabling the secure electronic document to accept written signatures from the signing individuals at the signature tag locations;

transmitting the secure electronic document to the at least one signing individual for the purpose of obtaining a signature; and sizing an unsigned signature bounding box on a signature capture device based on a type of the signature tag at the signature location, wherein the signature bounding box is displayed independently of a display of the secure electronic document.

24. A method as in claim 23, further comprising obtaining a signature within the secure electronic document from the at least one signing individual using a signature capture device as the signature is written by the signing individual, the signature capture device being configured to enable the signing individual to inscribe their signature onto the signature capture device within the signature bounding box to allow the signing individual's signature to be embedded into the secure electronic document at the signature tag that indicates a location for the signing individual's signature.

25. A method for receiving an electronic document for embedding a written signature, comprising:

receiving a secure electronic document containing content configured to be uneditable and at least one signature tag;

selecting a signing individual from a signer list associated with the secure electronic document, wherein the signer list contains people selected to sign the secure electronic document;

advancing to the at least one signature tag in the secure electronic document related to the selected signing individual, wherein each signature tag defines a location within the electronic document for the selected signing individual to add the selected signing individual's signature;

sizing an unsigned signature bounding box on a signature capture device based on a type of the signature tag at the location, wherein the signature bounding box is displayed independently of a display of the secure electronic document; and obtaining a signature within the secure electronic document within the signature bounding box from the signing individual using the signature capture device as the signature is written by the signing individual, the signature capture device being configured to enable the signing individual to inscribe their signature onto the signature capture device to allow the signing individual's signature to be embedded into the secure electronic document at the signature tag that indicates a location for the signing individual's signature.

26. An article of manufacture, comprising:

a computer readable medium having computer readable program code embodied therein for embedding a written signature into an electronic document, the computer readable program code means in the article of manufacture comprising:

computer readable program code configured to form a placeholder electronic document containing content to be attested to by a signature;

computer readable program code configured to select a signing individual from a signer list to enable a selected signature location for the signing individual to be added to the placeholder electronic document;

computer readable program code configured to place a signature tag into the placeholder electronic document at the selected signature location, wherein the signature tag is associated with the signing individual and defines the selected signature location within the placeholder electronic document for the signing individual;

computer readable program code configured to secure the placeholder electronic document to form the secure electronic document having content configured to be uneditable;

computer readable program code configured to capture a signature with a signature capture device as the signature is written by the signing individual and at a time of a transaction, the signature capture device being configured to enable the signing individual to write the signature to be embedded into the secure electronic document at a location indicated by the signature tag to mimic a real world experience of signing paper documents; and computer readable program code configured to size an unsigned signature bounding box on the signature capture device before the signature is captured based on a type of the signature tag at the signature location, wherein the signature bounding box is displayed independently of a display of the secure electronic document.

* * * * *